US006779709B2

(12) United States Patent
Stotler et al.

(10) Patent No.: US 6,779,709 B2
(45) Date of Patent: Aug. 24, 2004

(54) PORTABLE INERTIA WELDER

(75) Inventors: Timothy Stotler, Perry Township, Franklin County, OH (US); Timothy J. Trapp, Upper Arlington, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 5 days.

(21) Appl. No.: 10/248,059

(22) Filed: Dec. 13, 2002

(65) Prior Publication Data

US 2004/0060966 A1 Apr. 1, 2004

Related U.S. Application Data

(60) Provisional application No. 60/319,586, filed on Oct. 1, 2002.

(51) Int. Cl.$^7$ .............................................. B23K 20/12
(52) U.S. Cl. ....................................... 228/113; 228/2.1
(58) Field of Search ........................... 228/112.1–114.5, 228/2.1, 2.3; 156/73.1

(56) References Cited

U.S. PATENT DOCUMENTS

| | | | |
|---|---|---|---|
| 3,144,710 A | * 8/1964 | Francis Camps-Campins et al. .................... 228/114.5 | |
| 3,185,368 A | 5/1965 | Holloway et al. .............. 228/2 | |
| 3,234,644 A | 2/1966 | Hollander ................... 29/470.3 | |
| 3,235,162 A | 2/1966 | Hollander ................... 29/470.3 | |
| 3,571,905 A | 3/1971 | Calton et al. ............... 29/470.3 | |
| 3,591,068 A | 7/1971 | Farmer et al. ................ 228/2 | |
| 3,596,570 A | * 8/1971 | Kenyon ....................... 92/168 | |
| 3,597,832 A | 8/1971 | Calton et al. ............... 29/470.3 | |
| 3,618,196 A | * 11/1971 | Sleutz ........................ 228/113 | |
| 3,704,821 A | * 12/1972 | Loyd et al. ................... 228/2.3 | |
| 3,750,263 A | * 8/1973 | Satzler et al. ............... 228/113 | |
| 3,775,834 A | * 12/1973 | Ishikawa et al. ......... 228/114.5 | |
| 4,012,885 A | 3/1977 | King, Jr. ...................... 403/408 | |
| 4,030,658 A | 6/1977 | Parrish .......................... 228/2 | |
| 4,049,182 A | 9/1977 | Louw et al. .................... 228/2 | |
| 4,067,490 A | 1/1978 | Jones et al. ................. 228/102 | |
| 4,079,491 A | 3/1978 | Richardson ................ 29/157.1 | |
| 4,129,241 A | 12/1978 | Devine, Jr. ................. 228/113 | |
| 4,757,932 A | 7/1988 | Benn et al. .................... 228/2 | |
| 5,154,340 A | * 10/1992 | Peacock ................... 228/114.5 | |
| 5,197,361 A | 3/1993 | Carrier et al. ................ 82/1.2 | |
| 5,558,265 A | * 9/1996 | Fix, Jr. ........................ 228/2.3 | |
| 5,849,146 A | * 12/1998 | Searle et al. ................ 156/580 | |
| 6,000,482 A | * 12/1999 | Michalski ..................... 175/57 | |
| 6,138,896 A | 10/2000 | Ablett et al. ................ 228/113 | |
| 6,199,916 B1 | * 3/2001 | Klinger et al. ........... 285/288.1 | |
| 6,413,022 B1 | 7/2002 | Sarh ............................ 408/76 | |
| 2002/0036225 A1 | 3/2002 | Foster et al. ............. 228/112.1 | |
| 2002/0081952 A1 | 6/2002 | Fritz et al. .................... 451/56 | |

OTHER PUBLICATIONS

Johnson, C.A. "Fricition Welding." in: O'Brien, R.L., Welding Handbook, 8th ed., 1991, vol. 2, pp. 740–763.

Stotler, T. Procedure Development and Practice Considerations for Inertia and Direct–Drive Friction Welding, in Olson, D.L. et al., ASM Handbook, 1993, vol. 6, pp. 888–891.

* cited by examiner

Primary Examiner—Kiley Stoner
(74) Attorney, Agent, or Firm—David J. Dawsey; Michael J. Gallagher; Gallagher & Dawsey Co., LPA

(57) ABSTRACT

A portable inertia welder is mounted in a housing so as to afford both axial and rotational movement of a shaft with flywheel weights. Rotational motion is provided by a motor affixed to the drive shaft while axial motion is provided by means of a hydraulic housing mounted around said shaft. A chuck mounted to the shaft holds a first workpiece for rotational and axial displacement. Holding devices such as vacuum cups secure the welder to a second workpiece. A flash cutting tool and an appurtenance with a flash trap, welding flats, and an internally threaded bore are described.

15 Claims, 2 Drawing Sheets

PORTABLE INERTIA WELDER

CROSS REFERENCE TO RELATED APPLICATIONS

This application claims the benefit of U.S. Provisional Application No. 60/319,586 filed on Oct. 1, 2002, all of which is incorporated here by reference as if completely written herein.

FEDERAL RESEARCH STATEMENT

The U.S. Government has a paid-up license in this invention and the right in limited circumstances to require the patent owner to license others on reasonable terms as provided for by the terms of Contract No. N00140-96-C-0188, Navy Joining Center Project No. TDL 99-01 awarded by the Office of Naval Research (ONR).

BACKGROUND OF INVENTION

1. Field of the Invention

This invention pertains to friction welding and more particularly to a portable inertia friction-welding machine.

2. Background of the Invention

Friction welding is a solid-state process in which workpieces are placed under compressive force with each other. The contact surfaces (joint or faying surfaces) are moved with respect to each other, typically by rotation, to produce sufficient heating to weld the workpieces together. Various types of friction welding are detailed in the AWS Welding Handbook, 8th Ed., Vol. 2, American Welding Society, 1991.

Two types of friction welding are in common use: 1) direct-drive friction welding and 2) inertia friction welding. In direct-drive friction welding, one of the workpieces is loaded into a rotating spindle and brought into contact with a second workpiece under a low compressive force referred to as a first friction force or preheat force. In some cases, the first friction force may not be used. Frictional heating is continued for a preset time or displacement distance, i.e., the distance the two workpieces move toward each other due to the first compressive force. Typically a higher compressive force, termed the second friction force or welding force is then applied causing plasticized metal to be extruded from the joint (contacting surfaces of the two workpieces). Again the second compressive force may be applied for a preset time or distance. The rotating spindle is then brought to a stop by means of a braking system such as a caliper and/or by means of an electric brake in the spindle drive motor. A third compression force, typically referred to as the upset force, is applied to consolidate the joint. The upset force may be applied while the spindle is braking or after it stops. If the upset force is applied while braking, the microstructure of the joint reflects a rotational-type of forging. If the upset force is applied after the spindle has stopped, the microstructure of the joint reflects an axial-type of forging.

In inertia friction welding, the frictional heating is provided by stored rotational kinetic energy in the form of one or more flywheels mounted on the rotating spindle. The inertia of the system is changed by either adding or removing flywheels from the spindle or changing the spindle rotational speed or both. To begin the welding process, the two workpieces are loaded into the welding machine, typically one workpiece is secured to the spindle and the other workpiece secured to the tailstock of the machine. The spindle is then accelerated to a predetermined velocity, i.e., rotational speed typically expressed in revolutions per minute (rpm)), and the spindle drive means is disengaged allowing the spindle, with attached flywheel(s), and the workpiece mounted in the spindle to coast. The rotating workpiece is then brought into contact with the stationary workpiece with an applied compressive force to begin the frictional heating of the two workpieces. The flywheel comes to a stop as its kinetic energy is transitioned into thermal energy (frictional heating) at the interface of the two workpieces. In some cases, as the flywheel slows down or after it has stopped, the compressive force is increased so as to apply an upset force to complete the joint. Additional details as to inertia and direct-drive friction welding can be found in T. Stotler, "Procedure Development and Practice Considerations for Inertia and Direct-Drive Friction Welding" in ASM Handbook, Volume 6, ASM International, United States, 1993, pp. 888–891.

As noted above, friction welding has largely focused on direct-drive and inertia welders. Both of these welders have been extremely large units securely mounted to the shop floor and often weigh a ton or more. U.S. Pat. Application Pub No. US 2002/0036225 Al illustrates a friction-welding machine while U.S. Pat. Nos. 3,235,162; 3,234,644; 3,571,905; 3,591,068; and 4,030,658 illustrate inertia welding machines. In both the direct-drive and inertia machines, the tailstock-mounted workpiece has been used to apply the compressive forces by axially moving the tailstock-mounted workpiece toward the rotating second workpiece mounted in a rotating chuck. That is, the rotating chuck (and a first workpiece) was mounted to be axially stationary; the second workpiece was secured in the tailstock piece to be rotationally stationary but moveable in an axial direction in order to apply the requisite compressive force. Typically both the rotating chuck and the tailstock were mounted on a base with the tailstock drawn toward the rotating chuck by mechanical means. Some machines use a fixed tailstock in which compressive forces are achieved by moving the rotating unit by means of a carriage and piston assembly.

One of the first attempts at producing a portable machine is found in U.S. Pat. No. 3,185,368. Although various improvements were made to make the machine as light as possible, it remained a massive machine that was truck mounted for use in the field. Although there are some portable friction welders on the market, these machines have difficulty welding large diameter parts (i.e., greater than about ¾-in.) or welding materials that need short welding times such as aluminum, due to the high torque requirements. These machines are direct-drive friction welders to avoid the need for large and heavy flywheels although, occasionally a small amount of additional weight is occasionally used to overcome the initial torque peak and motor stalling that occurs when the workpieces first touch. Even in these cases, the only way to overcome the low-torque capabilities is to reduce the initial compressive forces significantly. However, this dramatically increases the weld time and, unfortunately, such long weld times often have a detrimental affect on the mechanical properties of the resulting weld of the workpiece materials. At best, these machines can only friction weld small studs or appurtenances (less than about ½ inch in diameter) to plates or pipe with a resulting low pull-off strength, typically less than 30,000 lbs.

To achieve the required torque and spindle speed for a direct-drive unit for large appurtenances with a 30,000 lb pull off strength would require at least a ten horsepower electric motor in combination with a large gear box. This results in a machine that is either too large and heavy to carry and position, i.e., is no longer portable, or too large to obtain access to the welding area, e.g., the inside of a vehicle. To even consider the use of inertia welders with their large and heavy flywheels for welding appurtenances greater than ½ or ¾ inch diameter flies in the very face of portability.

In addition to the inability of current portable direct-drive friction welders to weld large diameter appurtenances, i.e., appurtenances having a minimum pull-off strength of 30,000 lb, there are additional problems in using such units, especially when attempting to weld internally threaded, large diameter appurtenances. First of all, plasticized metal formed during the welding process extrudes into the internal threads at the base of the appurtenance and blocks the effective use (maximum engagement) of the internal threads. Second, the plasticized metal also extrudes on the external surface of the appurtenance and can interfere with the attachment of parts to the plate using the appurtenance. That is, the part cannot be screwed into the appurtenance and brought flush with the plate to which the appurtenance is joined. The extruded metal (flash) can also promote crevice corrosion when the resulting assembly is exposed to hostile environments such as seawater or corrosive chemicals. Third, it is difficult to grasp an internally threaded appurtenance in the welder to effectively produce both rotational and compressive axial forces. This can result in rotational slippage and, as a result, there may be insufficient heating to produce a satisfactory weld. It can also result in axial slippage that can result in both insufficient heating and compressive (forging) force to achieve a satisfactory weld. Fourth, it has been found that there can be more than a fifty percent loss of weld strength when no steps are taken to prepare the plate surface to which the appurtenance is attached.

However, there are many applications (e.g., heavy-duty construction and military vehicles, planes, sea vessels and other units) in which it is desirable to mount various large fasteners, mounting projections, and so forth, i.e., appurtenances, to panels (e.g., floors, walls, ceilings). Unfortunately and due to the various factors noted above, it has not been possible to use friction welding machines (either direct drive or inertia) for the joining of heavy-duty (large) appurtenances. As such, other more portable welding techniques such as gas metal arc welding (GMAW) have been used to weld these appurtenances to the requisite panels. Unfortunately, GMAW is a relatively time-consuming method that requires a high degree of welder skill due to the weld joint position and location within a particular unit. A typical time for welding a single appurtenance is about thirty minutes. Further, some mechanical loss also occurs when using GMAW. Given that certain units may require up to a thousand appurtenances, it becomes apparent that a faster and easier method of appurtenance attachment is a critical need, especially in current times when the development of rapid methods for the assembly of all-terrain vehicles, planes, and vessels is essential to national security.

Accordingly, it is an object of the present invention to provide a portable friction-welding machine for producing welds with a pull off strength greater than 30,000 lbs.

It is another object of the present invention to provide a portable friction-welding machine for welding appurtenances with a diameter greater than about ½ inch in diameter and preferably greater than ¾ inch diameter.

It is another object of the present invention to provide a portable inertia welder.

It is an object of the present invention to provide an internally threaded appurtenance that avoids obstruction of the internal treads by flash from the welding process.

It is another object of the present invention to attach the welding machine to the surface to which the appurtenance is to be welded in a stable manner that allows for complete transfer of rotational and compressive forces to the welding process.

It is a further object of the present invention to provide a method of preparing the plate to which the appurtenance is attached that maximizes weld strength.

SUMMARY OF INVENTION

These objectives are met with the present invention of an inertia welder that comprises a welder housing and a drive shaft that is capable of movement in the direction of its longitudinal axis as well as of rotational movement within its mountings to the housing. A motor, typically hydraulic or pneumatic, is mounted to the drive shaft and drives the drive shaft in rotation. A flywheel is mounted on the drive shaft so that it rotates with the drive shaft. A hydraulic housing with a cylindrical bore is mounted to the welder housing in a fixed position and contains a moveable piston within the cylindrical bore. One end of the piston and a first portion of the hydraulic housing form a first hydraulic chamber; the opposite end of the piston and a second portion of the hydraulic housing opposite the first portion forms a second hydraulic chamber. A first opening in the first portion of the hydraulic housing allows for the passage of hydraulic fluid into and out of the first hydraulic chamber by means of a first hydraulic line. Similarly, a second opening in the second portion of the hydraulic housing allows for passage of hydraulic fluid into and out of the second hydraulic chamber by means of a second hydraulic line.

The drive shaft rotatably passes through the hydraulic housing and through the piston to which it is axially secured. That is, the drive shaft rotates freely within the hydraulic housing and also moves axially (along it axis) within the hydraulic housing. Because the drive shaft is secured axially to the piston, the piston and the drive shaft move together in the direction of the longitudinal axis of the drive shaft. Preferably the drive shaft rotates within the piston but it is possible that the piston may also be rotationally fixed to the drive shaft in which case, the piston rotates within the hydraulic housing. When it is desired to move the piston longitudinally, hydraulic fluid is pumped into the first hydraulic chamber and removed from the second chamber. When it is desired to move the piston longitudinally in the opposite direction, hydraulic fluid is pumped into the second chamber and removed from the first chamber.

A chuck is mounted at the end of the drive shaft opposite the motor and secures and delivers both rotational and longitudinal forces from the drive shaft to a first workpiece sufficient to weld the first workpiece to a second workpiece.

One of the features of the present invention is that both the rotational force and the longitudinal force are delivered through the same shaft which has the advantage of reducing considerably the weight of the machine by eliminating bulky tailstock assemblies for securing and longitudinally moving the second workpiece. This is achieved by securing the welder housing to the second workpiece thereby positioning the second workpiece in a fixed position with respect to the welder. This completely eliminates the tailstock and allows the drive shaft to deliver both the rotational and longitudinal forces for the welding process. The welder housing can be secured to the second workpiece in a variety of ways including the use of mechanical clamps, vacuum clamps, and fasteners.

Since the motor is attached at one end of the drive shaft, it must be secured to the housing in such a manner as to prevent its rotation while at the same time it must be able to move translationally with the drive shaft. To this end, the present invention uses one or more guide rods that are secured to the housing and which pass through the motor housing in a direction parallel to the axis of the drive shaft and prevent rotation of the motor. However, the motor housing is free to move translationally along the guide rods thus allowing both the motor and drive shaft to move longitudinally in a direction along the longitudinal axis of the drive shaft.

Often the first workpiece, i.e., the workpiece rotated and axially driven by the drive shaft, is a circular appurtenance with a bottom portion and a top portion. For optimal performance of the inertia welder, it is desirable to have the drive shaft effectively and efficiently transfer both the rotation and linear axial forces to the appurtenance. To this end, the present invention features circular appurtenances having at least two opposing shoulders formed in the top portion which have the advantage of allowing for quick securement within the flats of the chuck and which have the further advantage of reliably transferring the rotational and longitudinal forces from the drive shaft.

Another feature of the present invention is the formation of a flash trap in the bottom interior portion of the circular appurtenance. The flash trap is formed by boring a hole in the bottom portion of the circular appurtenance that has a common axis with the circular appurtenance. The flash trap has the advantage of allowing for the accumulation of workpiece material (flash) as it extrudes from the interface of the two workpieces as they are welded together thereby preventing entry of the extruded material into a central bore within the appurtenance. Thus extruded material can be especially problematic when the bore is a threaded bore designed for the acceptance of a threaded member after the weld is complete.

Although there have been claims that cleaning of the workpiece is not necessary when a friction welder is used, it has been found that workpiece cleaning can impact significantly the strength of the weld formed using friction welding. To this end another feature of the present invention is the cleaning of the workpiece, especially workpieces formed from aluminum and aluminum alloys. Abrasive sanding and milling have been found to have the advantage of improving the weld strength by up to fifty percent. Contrary wise, wire brushing has been found to have little effect since it appears that the brushing technique merely grinds the impurities and oxides into the surface.

Finally it is to be realized that as the plasticized workpiece material extrudes from the interface between the two workpieces during the welding process, it forms a bead or curl of flash. For a circular appurtenance, the flash is formed around the circular perimeter of the appurtenance. Such flash can be especially troublesome when the appurtenance is used to anchor a fitting that is screwed into a threaded bore within the appurtenance. Often the flash prevents flush engagement of the fitting with the plate (second workpiece) to which the appurtenance is attached. To this end the present invention features a flash cutter that has at least two opposing flat sides that engage the flats of the chuck which is driven rotationally and longitudinally by the drive shaft. This has the advantage of allowing the flash to be quickly removed after the welding operation without having to reposition the inertia welder and avoids completely the use of other methods of flash removal.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
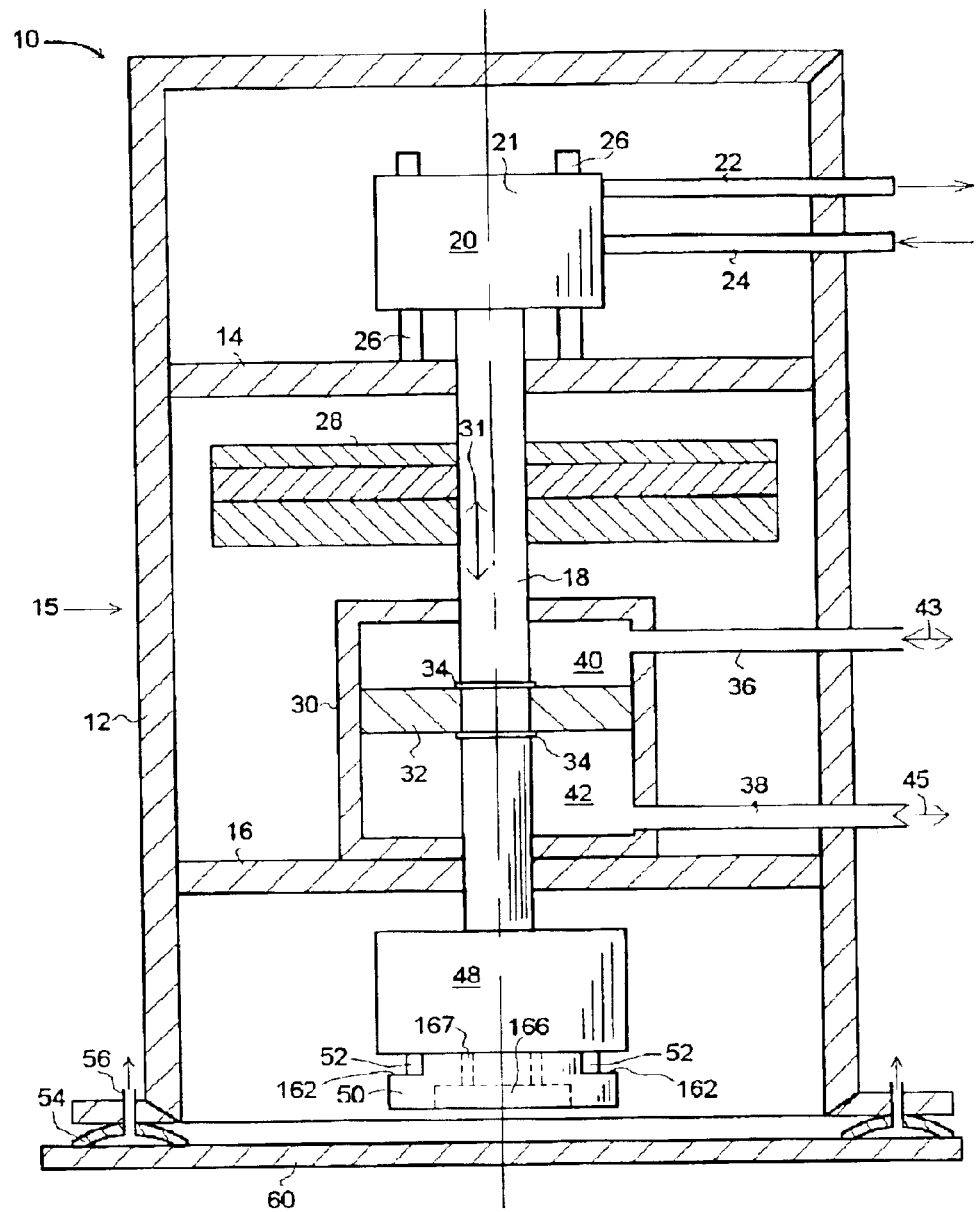
FIG. 1 is a cross-sectional view of the portable inertia welder of the present invention.

In describing the preferred embodiment of the invention, which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION

Referring to FIG. 1, the portable inertia welder of the current invention is designated by the numeral 10. A circular welder housing 15 comprises an outer shell 12 and has two spaced-apart plates 14, 16 rigidly attached to shell 12. A drive shaft 18 is rotatably mounted through plates 14, 16. The drive shaft 18 rotates with respect to plates 14, 16 and also can be moved in an axial direction with respect to plates 14, 16 as indicated by arrow 31.

A hydraulic motor 20 rotatably drives shaft 18 and is connected to a hydraulic pump (not shown) by means of flexible hydraulic fluid lines 22, 24. The housing 21 of the hydraulic motor 20 is restrained from rotational motion by means of guide rods 26 that are fixed to housing plate 14. Guide rods 26 allow for axial (up and down motion) of the motor 20 and shaft 18.

Flywheel weights 28 are securely fastened to shaft 18 and rotate with it. Weights 28 may be added or removed from shaft 18 depending on the inertial load required for a particular welding operation. As used here, a flywheel is a weight attached to the spindle of the welder with a mass large enough to store sufficient rotational energy to carryout the welding process from initial contact of the two workpieces until the two workpieces are joined without any rotational energy input from other sources such as the drive motor.

A hydraulic housing 30 is rigidly secured to the housing 15 by means of plate 16. Shaft 18 rotatably passes through hydraulic housing 30 and through piston 32, which is contained within housing 30. Piston 32 is axially secured to shaft 18 by means of snap rings 34 or other axial securing methods that allow shaft 18 to rotate within hydraulic housing 30. Hydraulic lines 36 and 38 allow hydraulic fluid to enter and leave fluid chambers 40 and 42 as indicated by arrows 43, 45. When fluid enters line 45 into chamber 42, hydraulic fluid leaves chamber 40 via line 43 and causes piston 32 to move in an upward direction. Because piston 32 is axially secured to shaft 18, shaft 18 also moves in an upward direction as indicated by arrow 31.

A collet or chuck 48 is mounted on shaft 18 for rotation with shaft 18. Chuck flats 52 secure a first workpiece 50 for rotation and axial movement with shaft 18. When the first workpiece is a range of appurtenances with variable size and shape, a chuck 48 with variable sized flats (collet or screw type) is typically used to secure a first workpiece 50 for rotation and axial movement with shaft 18. The flats may be manually or hydraulically activated for securing the appurtenance 50 in the chuck flats. Alternatively, when the appurtenance is of one size, a simple workpiece driver may be used, e.g., a driver that is screwed onto shaft 18 and has, for example, two internal flats that accept two external flats on the appurtenance.

The housing 15 is rigidly secured to the second workpiece 60 with a securing device such as vacuum clamps 54. Other securing devices, such as bayonet clamps, C-clamps, beam clamps, bolts, screws, etc. may also be used to secure the inertia welder to the second workpiece 60. The securing device used depends to a large extent on the configuration and accessibility of second workpiece 60.

Figure 2:
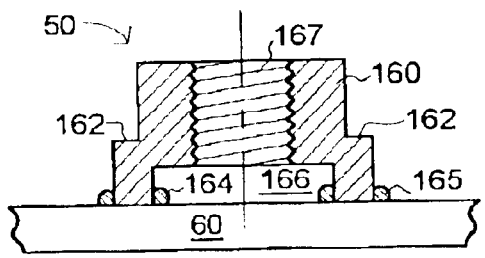
FIG. 2 is a cross-sectional view of a first workpiece (appurtenance) joined to a second, flat workpiece using the portable inertia welder of the present invention.

In operation, the portable inertia welder 10 is located in position and secured to the second workpiece 60 with a securing device such as vacuum clamps 54 which are connected to a vacuum generator (not shown) by line 56. The first workpiece 50 is secured within flats 52 of collet 48 for rotation with shaft 18. The hydraulic pump (not shown) is activated and pumps hydraulic fluid to motor 20 to rotate shaft 18 along with the flywheel 28, collet 48, and attached workpiece 50. After shaft 18 and flywheel 28 have reached a predetermined rotational speed, oil pressure is shut off to motor 20 and shaft 18 is allowed to coast as a result of the inertia built up in flywheel 28. At this point, hydraulic fluid is pumped into chamber 40 while hydraulic fluid is withdrawn from chamber 42. This causes piston 32 to move downward. Because piston 32 is axially secured to shaft 18, it also moves axially in a downward direction to bring the rotating workpiece 50 in contact with second workpiece 60 with a first axial force. Such rotational contact produces frictional heating of both workpieces 50, 60. When the contacting areas of workpieces 50, 60 are heated to a plasticized state and the rotational energy of flywheel 28 nearly dissipated as a result of the frictional heating of workpieces 50, 60, that is, the rotational motion of shaft 18 has nearly stopped, additional fluid could be pumped into chamber 40 to apply a second, forging force., if needed. As a result of the forging (welding) force, a small amount of the plasticized material extrudes from the interface between the two workpieces in the form of flash 164 and 165 (FIG. 2). After the weld between workpieces 50, 60 is complete, the flats 52 of collet 48 are opened and hydraulic fluid is pumped into chamber 42 and withdrawn from chamber 40 causing shaft 18 and attached collet 48 to move in an upward direction and clear the workpiece 50 which has now been welded to workpiece 60. The vacuum clamps 54 are released and the inertia welder can be moved to a new location if additional workpieces are to be welded to workpiece 60.

As will be apparent to those skilled in the art, plates 14 and 16 may be located at various positions along shaft 18. For example plate 16 could be placed between the flywheel 28 and the top of hydraulic cylinder 20 with the top of the cylinder mounted to the bottom of plate 16. Similarly housing 15 may be open in sections for access to the flywheel 28, hydraulic unit 30, and/or motor 20. Roller bearings and seals used with hydraulic cylinder 30 and hydraulic motor 20 are conventional and have not been shown. Motor 20 could also be an electrical motor; however, for portability purposes, the power and light weight afforded by a hydraulically driven motor are preferred. Alternatively, a pneumatic motor can also be used. Finally, it is to be realized that although the present invention is designed with portability in mind, it can be mounted on a gantry or production table for production line use.

In attaching an appurtenance such as threaded part 50 made, for example, from aluminum alloy 62219-T87 to an aluminum 2519-T87 plate 60, the effect of pre-weld surface preparation was determined. Wire brushing was ineffective, as it tends to smear the plate oxides rather than removing them. Abrasive sanding is an acceptable method of surface preparation as is milling. If milling is used, the final pass should be done without lubricant to reduce the opportunity for introduction of foreign materials onto the surface. It has been determined that actual welding may be delayed for up to eight days after abrasive or milling surface preparation without providing a measurable effect on weld quality or pull strength. Grinding wheels or cutting disks are less preferred as they tend to produce deep gouges in the plate that reduce the effective area of the weld. With appropriate surface preapration, it has been possible to weld the above noted alluminum appurtenances having a 1.625 in diameter to the noted plate with a pull off strength of greater than 30,000 lbs and even approaching pull-off strengths of 45,000 lbs using the portable inertia welder of the current invention.

When an acceptable weld is produced, flash 164, and 165 (FIG. 2) is found at the edge of the interface between appurtenance 50 and plate 60. In certain applications, flash 165 can hinder placement of additional fixtures in the region of flash 165. In addition, small crevices between flash 165 and the appurtenance 50 and plate 60 may collect harmful or corrosive materials, e.g., seawater or corrosive gases and chemicals that may prematurely degrade the weld. To avoid such failure, it is desirable to remove flash 165.

Figure 3:
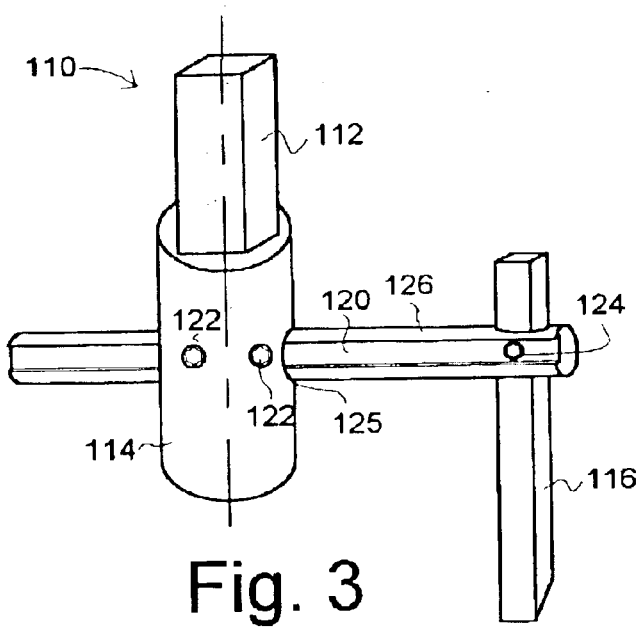
FIG. 3 is a perspective view of a flash cutting tool for use with the portable inertia welder of the present invention.

A cutting tool 110 such as that illustrated in FIG. 3 can be used with the inertia welder 10 of FIG. 1 to remove the flash. The flash cutter 116 is mounted in holder 120 by means of a setscrew 124. The holder 126 passes through a passage 126 in the barrel 114 of mounting shaft 112. One or more set screws 122, engage a slot 120 in holder 126 and prevent rotation of holder 126 about its axis and also determine the radius of the cut of the cutter 116. Mounting shaft 112 is adapted for use with chuck 48 of welder 10 (FIG. 1), i.e., flats on opposite sides of shaft 112 engage flats 52 of chuck 48. Preferably the flash cutting tool 110 is electronically controlled through the use of rotational speed and axial displacement sensors. Such electronic control is well known in the art and may be readily implemented in the current inertia welder using conventional electronic control techniques known to those skilled in the art as illustrated in U.S. Pat. Nos. 4,067,490 and 3,591,068 all of which are here incorporated by reference as if completely written herein.

As shown in FIG. 2, an internal flash trap 166 is used to accommodate the formation of flash 164 and prevent its interference with the threaded portion 167 of appurtenance 50 when circular appurtenance (workpiece) 50 is joined to workpiece 60. Two shoulders 162 cut on opposite sides of circular appurtenance 50 provide for ample torque delivery and axial welding force from the inertia welder.

It is possible that changes in configurations to other than those shown could be used but that which is shown is preferred and typical. Without departing from the spirit of this invention, various means of affixing the components to the common shaft welder shaft may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

What is claimed is:

1. An inertia welder comprising:
   1) a housing;
   2) a drive shaft with a longitudinal axis rotationally mounted to said housing and moveable in a direction along said longitudinal axis;
   3) a motor rotatably driving said drive shaft;
   4) flywheel mounted on and rotating with said drive shaft;
   5) hydraulic housing mounted to said housing and containing a moveable piston;
   6) said piston having a first end and a second opposite end;
   7) said first end of said piston and a first portion of said hydraulic housing forming a first chamber and said opposite end of said piston and a second portion of said hydraulic housing forming a second chamber;
   8) said first portion of said hydraulic housing having a first line opening formed therein and said second portion of said hydraulic housing having a second line opening formed therein;
   9) said drive shaft rotatably passing through said hydraulic housing in a longitudinal direction and attached to said piston so as to be longitudinally immoveable with respect to said piston; and
   10) a chuck mounted on said drive shaft for securing and delivering rotational and longitudinal forces from said drive shaft to a first workpiece sufficient to weld said first workpiece to a second workpiece.

2. The inertia welder according to claim 1 further comprising a securing device for securing said housing to a second workpiece.

3. The inertia welder according to claim 2 wherein said securing device for securing said housing to a second workpiece is a vacuum clamp.

4. The inertia welder according to claim 1 wherein said motor is restrained from rotational motion by means of a guide rod attached to said housing and allowing for axial movement of said motor.

5. The inertia welder according to claim 1 wherein said first workpiece is a circular appurtenance having a top and a bottom portion with said top portion having at least two shoulders formed therein for receiving securing flats of said chucks.

6. The inertia welder according to claim 1 wherein said first workpiece is a circular appurtenance having a top and a bottom portion with said bottom portion having a flash trap formed in the interior of said bottom portion.

7. The inertia welder according to claim 1 wherein said first workpiece is a circular appurtenance having a longitudinal threaded bore formed therein.

8. The inertia welder according to claim 1 wherein said rotational force delivered to said first workpiece is delivered solely by means of said flywheel.

9. The inertia welder according to claim 2 wherein said second workpiece is cleaned prior to welding of said first workpiece.

10. The inertia welder according to claim 9 wherein said second workpiece is cleaned by abrasive sanding.

11. The inertia welder according to claim 9 wherein said second workpiece is cleaned by milling.

12. The inertia welder according to claim 1 further comprising a flash cutter mounted in said chuck and driven rotationally and longitudinally by said drive shaft.

13. A method of joining a first workpiece to a second workpiece comprising:
   1) providing an inertia welder comprising:
      a) a housing;
      b) a drive shaft with a longitudinal axis rotationally mounted to said housing and moveable in a direction along said longitudinal axis;
      c) a motor rotatably driving said drive shaft;
      d) a flywheel mounted on and rotating with said drive shaft;
      e) a hydraulic housing mounted to said housing and containing a moveable piston;
      f) said piston having a first end and a second opposite end;
      g) said first end of said piston and a first portion of said hydraulic housing forming a first chamber and said opposite end of said piston and a second portion of said hydraulic housing forming a second chamber;
      h) said first portion of said hydraulic housing having a first line opening formed therein and said second portion of said hydraulic housing having a second line opening formed therein;
      i) said drive shaft rotatably passing through said hydraulic housing in a longitudinal direction and attached to said piston so as to be longitudinally immoveable with respect to said piston; and
      j) a chuck mounted on said drive shaft for securing and delivering rotational and longitudinal forces from said drive shaft to a first workpiece sufficient to weld said first workpiece to a second workpiece;
   2) providing hydraulic fluid to said second hydraulic chamber and withdrawing hydraulic fluid from said first hydraulic chamber to raise said drive shaft upward in said housing;
   3) attaching said housing to a second workpiece;
   4) placing a first workpiece in said chuck;
   5) operating said motor to drive said drive shaft and said flywheel to a predetermined rotational speed;
   6) stopping said motor so as to allow said flywheel to coast as a result of inertial built up in said flywheel; and
   7) pumping hydraulic fluid into said first hydraulic cylinder and withdrawing hydraulic fluid from said second hydraulic cylinder to axially move said rotating first workpiece in contact with said second workpiece to weld said workpieces together.

14. The method of joining a first workpiece to a second workpiece according to claim 13, further comprising the step of providing hydraulic fluid to said second hydraulic chamber and withdrawing hydraulic fluid from said first hydraulic chamber to raise said drive shaft upward in said housing to release said first workpiece from said chuck after said first workpiece has been welded to said second workpiece.

15. The method of joining a first workpiece to a second workpiece according to claim 14 further comprising the steps of:

1) inserting a flash cutter into said chuck;
2) rotating said drive shaft and attached flash cutter with said motor;
3) pumping hydraulic fluid into said first hydraulic cylinder and withdrawing hydraulic fluid from said second hydraulic cylinder to axially move said rotating flash cutter in contact with flash formed in said welding step so as to remove said flash;
4) providing hydraulic fluid to said second hydraulic chamber and withdrawing fluid from said first hydraulic chamber to raise said drive shaft upward in said housing; and
5) removing said flash cutter from said chuck.

* * * * *